(12) United States Patent
Smith et al.

(10) Patent No.: US 8,772,690 B2
(45) Date of Patent: Jul. 8, 2014

(54) MULTI-FUNCTIONAL STAR TRACKER WITH PRECISION FOCAL PLANE POSITION CONTROL FOR SMALL CUBESAT-CLASS SATELLITES

(75) Inventors: Matthew W. Smith, Pasadena, CA (US); Christopher M. Pong, Kaneohe, HI (US); Sungyung Lim, Acton, MA (US); David W. Miller, Sharon, MA (US); Sara Seager, Concord, MA (US); Shawn Murphy, Cambridge, MA (US)

(73) Assignees: The Charles Stark Draper Laboratory, Cambridge, MA (US); Massachusetts Institute of Technology, Cambridge, MA (US)

( * ) Notice: Subject to any disclaimer, the term of this patent is extended or adjusted under 35 U.S.C. 154(b) by 353 days.

(21) Appl. No.: 13/364,261

(22) Filed: Feb. 1, 2012

(65) Prior Publication Data

US 2013/0193303 A1 Aug. 1, 2013

(51) Int. Cl.
*G01C 21/02* (2006.01)
*G05D 1/00* (2006.01)

(52) U.S. Cl.
USPC .......................................... 250/203.6; 701/13

(58) Field of Classification Search
CPC ......... B64G 1/24; B64G 1/361; G05D 1/0883
USPC ......................................... 250/203.6; 701/13
See application file for complete search history.

(56) References Cited

U.S. PATENT DOCUMENTS

2012/0199697 A1* 8/2012 Nagabhushan et al. ...... 244/165

OTHER PUBLICATIONS

Smith, Matthew W. et al., "ExoplanetSat: Detecting and monitoring exoplanets using a low-cost, CubeSat platform," Proceedings of SPIE, vol. 7731, No. 773127, Aug. 2010.
Pong, Christopher M. et al., "Achieving high-precision pointing on ExoplanetSat: Initial feasibility analysis," Proceedings of SPIE, vol. 7731, No. 77311V, Aug. 2010.
Pong, Christopher M. et al., "One-Arcsecond Line-Of-Sight Pointing Control on Exoplanetsat, a Three-Unit Cubesat," Proceedings of Am. Astron. Soc. 34th Annual Guidance and Control Conference, 11-035 (Feb. 2011).

* cited by examiner

*Primary Examiner* — Thanh Luu
(74) *Attorney, Agent, or Firm* — Lando & Anastasi, LLP

(57) ABSTRACT

An optical system for use in an Earth-orbiting satellite includes a plurality of image sensors disposed on a focal plane having a reference axis orthogonal thereto, optics configured to focus incident light onto the image sensors, a piezoelectric actuator coupled to the image sensors and configured to translate the image sensors in at least two axes each orthogonal to the reference axis, and at least one controller operably coupled to the plurality of image sensors and the piezoelectric actuator. The image sensors are configured to generate at least one image frame from light detected by the plurality of image sensors, the image frame including a target star and at least one guide star. The controller is configured to stabilize the position of the target star by adjusting the position of the piezoelectric actuator based on the changes in the position of the guide star.

24 Claims, 11 Drawing Sheets

MULTI-FUNCTIONAL STAR TRACKER WITH PRECISION FOCAL PLANE POSITION CONTROL FOR SMALL CUBESAT-CLASS SATELLITES

BACKGROUND

Most satellites with science missions of observing target stars use reference objects, such as stars in the neighborhood of the target stars, for attitude estimation and science image jitter detection. The attitude of a satellite is the orientation of the on-board instruments (e.g., a telescope) with respect to the reference objects. Attitude determination with a star camera and associated control systems are used to point the satellite in a desired direction and to maintain the orientation over some period of time. But the pointing accuracy achieved using conventional systems is not typically enough for the mission because the high-frequency jitter induced by the satellite subsystems, such as reaction wheels, affects the quality of the science image. The jitter of the science image is then measured by a guide sensor (or called as star tracker) from dispersed light of the target stars or light of the guide star and stabilized by control systems inserted in the optical path of the target stars. Conventional star camera, star tracker and science optical payloads utilize separate components that contribute to the size, mass and complexity of the satellite.

SUMMARY

Aspects and embodiments are directed to optical systems for use in Earth-orbiting satellites. In one aspect, the satellite is configured to perform multiple functions, including, for example, star camera, star tracking and science data collection, using an optical system having optics that focuses light onto multiple image sensors disposed on a piezoelectric translation stage. The image sensors are arranged along a focal plane. A two-stage control system is used for coordinated rigid-body attitude control of the satellite and high-precision image stabilization of the optical system. In the first stage, coarse attitude control is performed using a reaction wheel unit for pointing the satellite to within approximately 120 arcseconds of a target star. In the second stage, precision position control of the image sensors (within several microns) is performed using the piezoelectric stage actuator. This is equivalent to controlling the optical pointing of the image sensors to within several arcseconds.

According to one embodiment, an optical system for use in an Earth-orbiting satellite includes a plurality of image sensors disposed on a focal plane having a reference axis orthogonal thereto, the image sensors configured to generate at least one image frame from light detected by the image sensors, the at least one image frame including a target star and at least one guide star, optics configured to focus incident light onto the image sensors, a piezoelectric actuator coupled to the image sensors and configured to translate the image sensors in at least two axes each orthogonal to the reference axis, the piezoelectric actuator having a position with respect to the reference axis, and at least one controller operably coupled to the image sensors and the piezoelectric actuator. The controller is configured to determine a position of the target star within the at least one image frame, track changes in a position of the at least one guide star within the at least one image frame, stabilize the position of the target star by adjusting the position of the piezoelectric actuator based on the changes in the position of the at least one guide star, generate a pointing error of the satellite based on the changes in the position of the at least one guide star, and stabilize an attitude of the satellite based at least on the pointing error.

In one embodiment, at least one of the image sensors may have a smaller pixel size than another one of the image sensors. In another embodiment, the image sensors may include a science optical sensor and at least one tracking sensor disposed adjacent to the science optical sensor. The science optical sensor may be configured to operate at a science optical sensor rate, and the at least one tracking sensor may be configured to operate at a tracking sensor rate that is not less than the science optical sensor rate.

In one embodiment, the at least one tracking sensor may be configured to generate the at least one image frame including the at least one guide star. In another embodiment, the science optical sensor may be configured to generate the at least one image frame including the at least one target star. In yet another embodiment, the science optical sensor may include a charge coupled device (CCD) optical sensor and/or a complementary metal-oxide-semiconductor (CMOS) detector. In yet another embodiment, the at least one tracking sensor may include a CMOS detector.

In one embodiment, the optics may include a single-lens reflex (SLR) camera lens. In another embodiment, the optics may include folded optics. In yet another embodiment, the optics may include a Cassegrain reflector.

In one embodiment, the focal plane array, the optics, the piezoelectric actuator and the controller may be configured to be mounted in a satellite having dimensions of approximately $10 \times 10 \times 34$ cm$^3$. In another embodiment, the mass of the satellite may be approximately 5 kilograms or less.

According to one embodiment, an optical system includes a plurality of optical sensors arranged on a focal plane and configured to generate an image, optics having a reference axis therethrough and configured and arranged to focus incident light onto the optical sensors, and a piezoelectric stage actuator coupled to the optical sensors and configured to translate the optical sensors in at least two axes each orthogonal to the reference axis. A method of operating the optical system in an Earth-orbiting satellite includes detecting at least three guide stars and a target star within the image, estimating an attitude of the satellite from positions of the at least three guide stars on the basis of a guide star database, stabilizing, within a coarse threshold, the attitude of the satellite with respect to a desired attitude by commanding changes to the attitude of the satellite based on a difference between the estimated attitude and the desired attitude, estimating an angular rate of the satellite from filtering or processing the positions of the at least three guide stars, estimating a position error of the target star based on the positions of the at least one guide star, and stabilizing, within a fine threshold that is smaller than the coarse threshold, a position of the target star with respect to one of the optical sensors by adjusting a position of the optical sensors with respect to the reference axis based on the estimated position error of the target star.

In one embodiment, estimating the attitude of the satellite may include estimating an attitude quaternion of the satellite using a quaternion-based attitude estimation algorithm. In another embodiment, the method may include refining the estimated attitude using an extended Kalman filter. In yet another embodiment, the method may include calculating positions of the at least three guide stars based on the image and at least one of a position of the piezoelectric stage actuator and a position of the optics.

In one embodiment, the method may include continuously estimating an angular velocity of the satellite based on a rate of change of the estimated positions of the at least three guide stars. In another embodiment, the method may include continuously estimating a rate of change of the position of the target star based on the angular velocity of the satellite. In yet another embodiment, the method may include intermittently calculating the position of the target star based on the image and at least one of a position of the piezoelectric stage actuator and a position of the optics. In yet another embodiment, estimating the position of the target star may include continuously estimating the position of the target star based on the intermittently calculated position of the target star and a rate of change of the position of the target star.

In one embodiment, the method may include combining two intermittently calculated positions of the target star and the rate of change of the position of the target star using a Kalman filter. In another embodiment, the method may include calculating the position error between the estimated position of the target star and a desired position of the target star.

In one embodiment, the coarse threshold may be approximately 120 arcseconds (3σ) or less and the fine threshold may be approximately 5 arcseconds (3σ) or less.

According to one embodiment, an optical system for use in an Earth-orbiting satellite includes a plurality of optical sensors, optics having a reference axis therethrough and configured to focus incident light onto the optical sensors, an actuator coupled to the optical sensors and configured to translate the optical sensors in at least two axes each orthogonal to the reference axis, and means coupled to the optical sensors and the actuator for independently stabilizing, using images generated by the optical sensors, an attitude of the satellite and a position of the optical sensors with respect to a target star.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
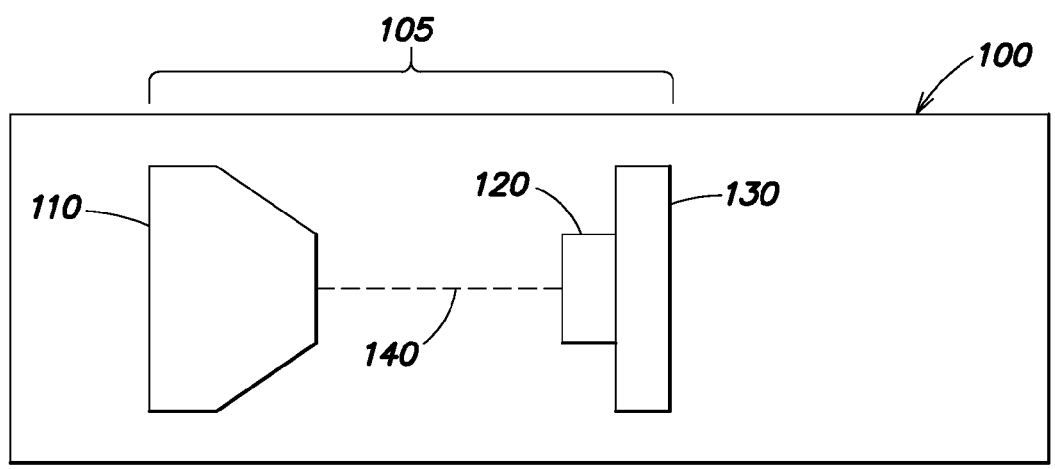
FIG. 1 is a diagram of one example of a satellite in accordance with aspects of the invention.

Aspects and embodiments are directed to optical systems for use in Earth-orbiting satellites, particularly, small-mass satellites. In some applications, such as a space telescope, high photometric precision is needed but limited by the sensitivity of the science instruments (e.g., an optical sensor). As a result, small changes in the line-of-sight pointing of the optical system (sometimes called jitter noise) can cause undesirable changes in the measurements of the instruments. Therefore a solution that achieves high photometric precision is desirable.

Small satellites, such as nanosatellites, i.e., spacecraft that weigh between 1 and 10 kg, may be used as platforms for conducting activities such as on-orbit science and optical communications. One advantage of small satellites is that they can be launched along with other satellites on a single launch vehicle and hence can be inserted into orbit at a greatly reduced cost. An example of a small satellite is a nanosatellite utilizing the CubeSat platform, which is a standardized nano-satellite configuration consisting of one, two, or three 10 cm×10 cm×10 cm units (1, 2, or 3 "U"s) arranged in a row, although other sizes and configurations may be used. Each unit or combination of units may contain a portion of the payload, such as an optical system in accordance with one embodiment. Multiple nanosatellites may optionally be coupled together on orbit to form a larger payload platform.

As discussed above, some small satellite payloads, such as space telescopes or communication systems, depend upon very precise pointing. For instance, a science mission using highly sensitive optical detectors may need to achieve high photometric precision, such as maintaining pointing of the optical detectors to within approximately 5.0 arcseconds, or less, depending on the mission requirements. However, due to their low mass and inertia, small satellites are easily susceptible to perturbations that can affect the performance of the payload.

The applicants have recognized and appreciated that the optical precision can be improved by utilizing a multi-axis piezoelectric stage actuator that translates the focal plane of the optical sensors to achieve an accuracy of several arcseconds. Translation of the optical sensors (also referred to herein as image sensors, optical detectors, or image detectors) can be used to compensate for some rotation of the satellite. The several arcsecond pointing capability is a one to two order of magnitude improvement over conventional attitude and pointing techniques for small-mass satellites.

Aspects and embodiments discussed herein are not limited in their application to the details of construction and the arrangement of components set forth in the following description or illustrated in the drawings. The embodiments described herein are capable of being practiced or carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1 is a block diagram of a small satellite 100 and a modular, low-mass optical system 105, according to one embodiment. The optical system 105 includes optics, such as a lens 110, a hybrid or composite array of images sensors 120 arranged along a single focal plane, and a piezoelectric stage actuator 130. The lens 110 is configured to focus incident light onto the image sensors 120, as shown by dashed line 140. The image sensors 120 are mounted to the piezoelectric stage actuator 130, which is configured to adjust the position of the image sensors 120 with respect to the lens 110. In one embodiment, the satellite 100 and the optical system 105 are configured to enable a combination of scientific and attitude control functions, including precise stabilization of star images on the image sensors 120, as discussed below.

Figure 2:
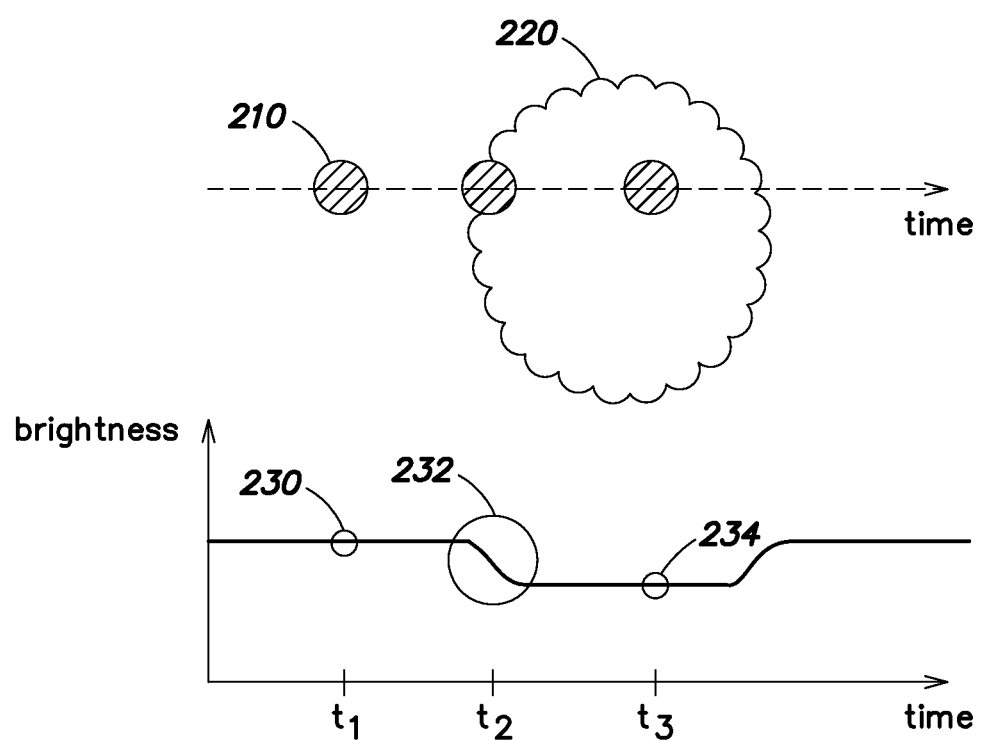
FIG. 2 is a diagram illustrating one example of a method of detecting exoplanets in accordance with aspects of the invention.

For example, the satellite 100 may be used for the detection, measurement and characterization of exoplanets, which are planets orbiting stars outside our solar system. If an exoplanet's orbital plane is aligned with the line of sight from Earth, the exoplanet will transit in front of the star causing the overall brightness of its star to dim. FIG. 2 is a diagram showing one example of the transit method concept where an exoplanet 210 transits in front of a star 220. At time $t_1$, the exoplanet 210 is not yet in the line of sight of the star from Earth, and therefore the observed brightness level of the star, indicated at 230, is not affected by the exoplanet. At time $t_2$, as the exoplanet 210 begins to pass into the line of sight of the star 220, light from the star 220 is partially blocked by the exoplanet, decreasing the brightness level, which is indicated at 232. At time $t_3$, the exoplanet 210 is completely within the line of sight of the star 220, and the brightness level of the star is decreased, as indicated at 234. The depth of a transit, i.e., the amount by which the target star brightness decreases during an exoplanet primary eclipse, is determined by the planet-to-star area ratio. An Earth-sized planet transiting a Sun-sized star has a transit depth of about $8.4 \times 10^{-5}$. Therefore it is desirable that an optical system be able to detect a roughly 1 part in 10,000, or 100 parts per million (ppm), reduction in stellar brightness, which involves a high degree of pointing precision.

Due to the sparse distribution of bright stars across the sky and the low probability of orbital plane alignment with the exoplanet, the discovery of Earth-sized exoplanets orbiting bright stars may rely on dedicated, inexpensive space missions continually monitoring a single target star for relatively long periods of time with a high degree of pointing accuracy. Accordingly, small satellites, such as satellite 100 discussed above with respect to FIG. 1, are well-suited for such missions because they are less expensive to produce, launch and operate than large satellites.

Figure 3:
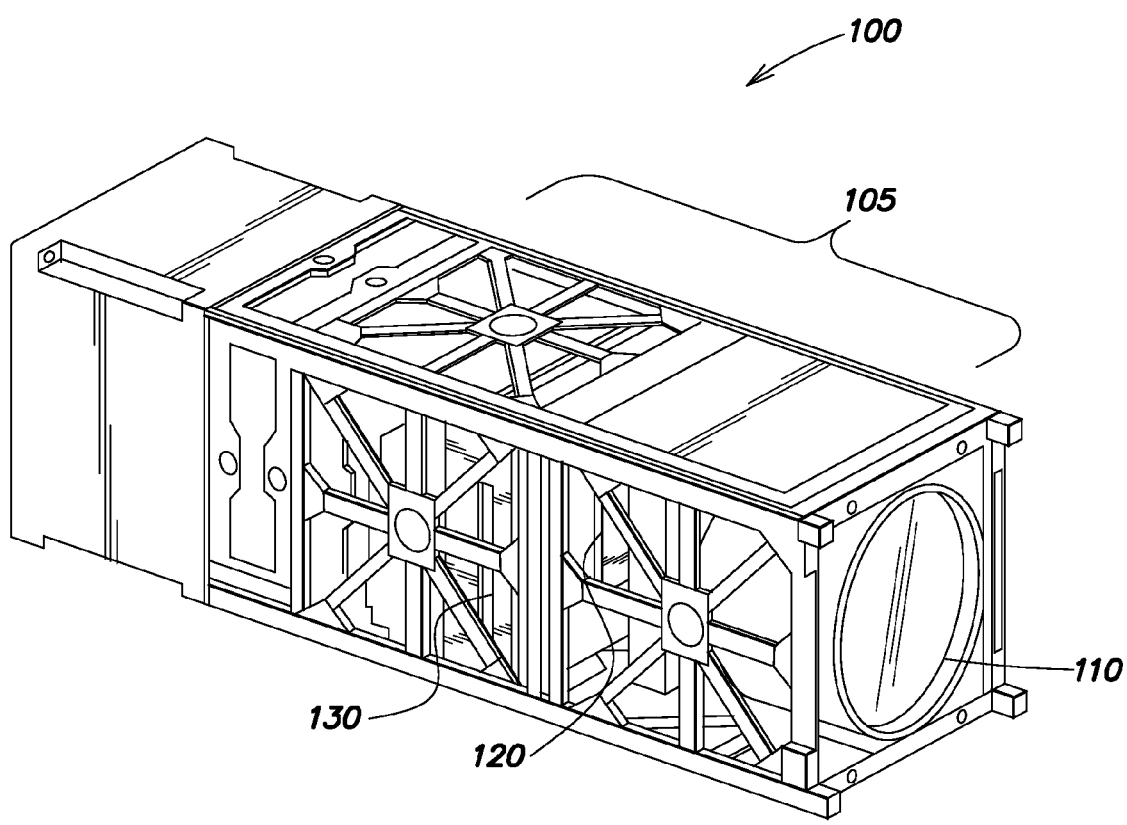
FIG. 3 is a perspective view of one example of a satellite in accordance with aspects of the invention.

FIG. 3 is a perspective view of the small satellite 100, according to one embodiment. The satellite 100 may be a triple-CubeSat (3U) nanosatellite measuring 10 cm×10 cm×34 cm. As discussed above, the optical payload 105 includes the lens 110 (e.g., an 85 mm single lens reflex (SLR) camera lens), the hybrid or composite image sensors 120, and the piezoelectric stage actuator 130 for fine positioning of the image sensors. The satellite 100 may include other hardware (not referenced in FIG. 3), for example, avionics, communications, power systems, magnetometers, gyroscopes, solar panels, reaction wheels and torque coils. In one example, the optical payload 105 may include a space telescope configured to detect an exoplanet 210, or other extraterrestrial object.

The image sensors 120 may, in one embodiment, perform up to three different functions: science, star camera, and star tracker. As used herein, the term "target star" means a star being observed for scientific purposes, such as for detecting an exoplanet, and the term "guide star" means a star that is observed near the target star. A guide star may be used, for example, as a reference point for satellite attitude control and/or image jitter control.

The science function includes collecting scientific data related to the target star (e.g., for detecting exoplanets) and typically uses highly sensitive science detectors having high quantum efficiency and large well depth. A science detector provides for slow imaging of target and/or guide stars. The star camera function typically has a large field of view to image enough stars for determining the attitude of the satellite 100, especially without a priori attitude information (conventionally called a "lost-in-space" function). The star tracker function uses images sensors having small pixels and small fields of view, in which only a few star images can be detected, which provides for rapid imaging of guide stars. While the small field of view is sufficient for making adjustments to the piezoelectric stage actuator 130, such images may be insufficient for determining the attitude of the satellite 100.

Figure 4A:
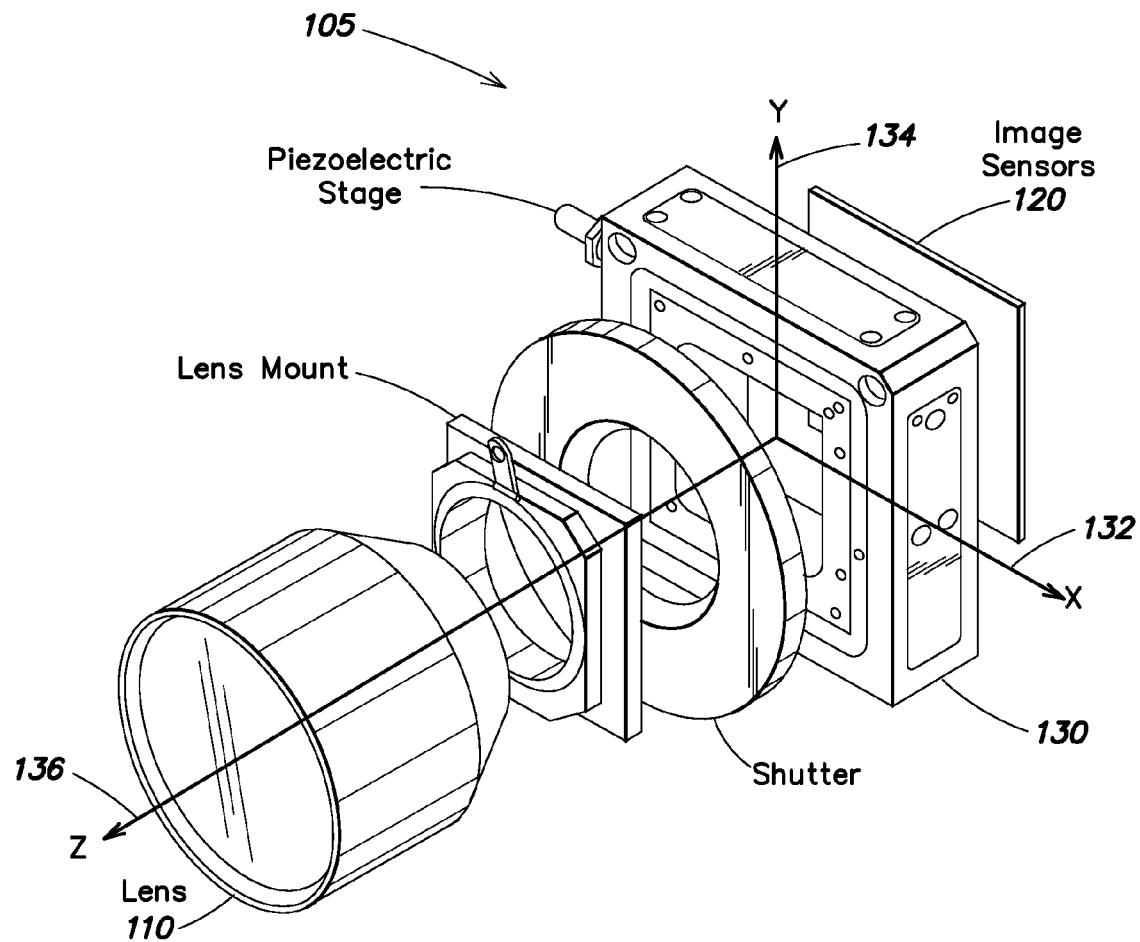
FIG. 4A is an exploded perspective view of one example of an optical system in accordance with aspects of the invention.

FIG. 4A is an exploded perspective view of one example of an optical system 105. The image sensors 120 are mounted to the piezoelectric stage actuator 130, which is configured to translate the image sensors 120 in at least two axes with respect to the lens 110, such as an x-axis 132 and a y-axis 134. The axes of the piezoelectric stage actuator 130 may, for example, be orthogonal to a boresight or optical axis 136 (z-axis) of the lens 110 or other reference point, for example, as discussed below with respect to FIG. 4B. By translating the piezoelectric stage actuator 130 in one or both axes 132, 134, the plane of the image sensors 120 may be translated with respect to the optical axis 136 and the lens 110 to provide fine adjustment of the image, as described below.

Figure 4B:
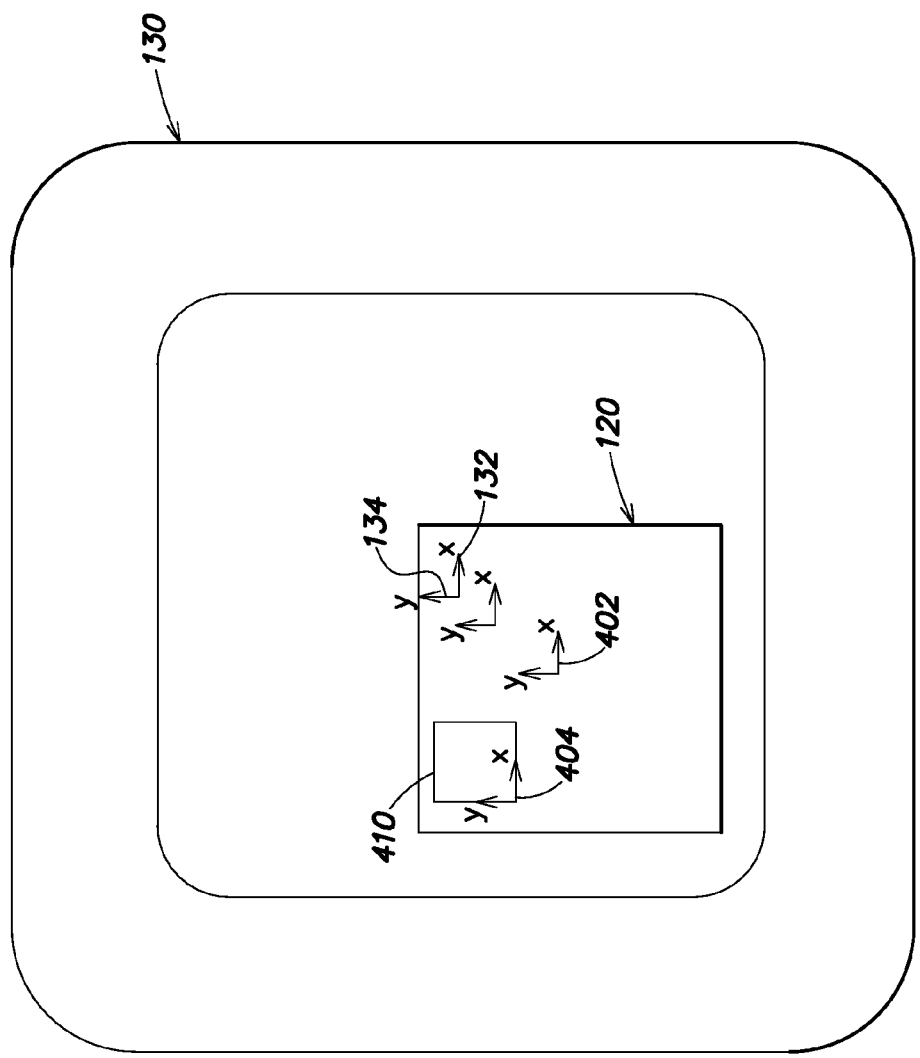
FIG. 4B is one example of a coordinate reference system corresponding to the optical system of FIG. 4A.

FIG. 4B is one example of a coordinate reference system corresponding to the optical system 105 of FIG. 4A. In FIG. 4B, the boresight or optical axis 136 of the lens 110 is not shown, but is orthogonal to the two-dimensional plane of the figure. As discussed above, the x-axis 132 and y-axis 134 are each orthogonal to the optical axis 136 and are fixed with relation to the lens 110. Since the piezoelectric stage 130 translates the image sensors 120, separate coordinate references can be established. For example, a fixed frame reference 402 can be placed with an origin at the center of the image sensors 120. Further, a fixed frame reference 404 can be placed with an origin at one corner of one or more individual sensors 410 within the array of image sensors 120. The reference frames 402 and 404 will translate with the image sensors 120. Therefore, different sensors 410 on the same plane of the image sensors 120 can have reference frames with different respective origins. As discussed below, these reference frames can be used for tracking stars and image stabilization.

Figure 5:
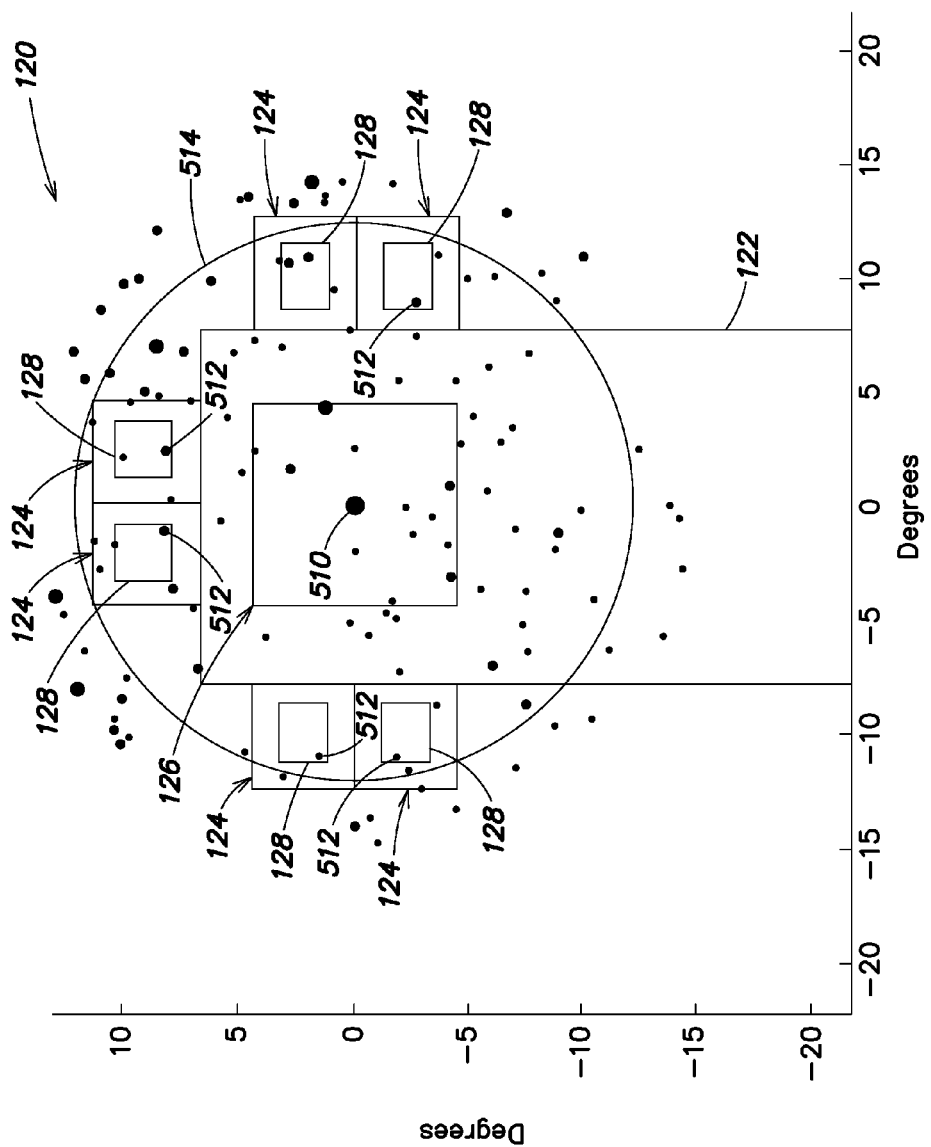
FIG. 5 is a front view of one example of multiple image sensors on a focal plane in accordance with aspects of the invention.

FIG. 5 is an exemplary front view of the image sensors 120, according to one embodiment. It should be appreciated that any number of different configurations of the image sensors 120 are feasible (e.g., the sensors may be different sizes, types, shapes, and may have different positions from what is shown in FIG. 5, which is merely exemplary of one embodiment). FIG. 5 also shows, for reference, an exemplary star pattern (e.g., starlight) superimposed upon the image sensors 120, including a target star 510 and several guide stars 512 (for clarity, not all guide stars are labeled in the figure) with brighter stars represented by larger dots, although it should be understood that the location and brightness of stars is dependent upon the orientation of the satellite 100 and the image sensors 120.

The image sensors 120 include a science optical sensor 122 and at least one tracking sensor 124. For example, the science optical sensor 122 can include a back-illuminated charge-coupled device (CCD) optical sensor for detecting light from at least the target star 510 (and potentially other stars). The tracking sensors 124 can include one or more complementary metal-oxide-semiconductor (CMOS) detectors to detect light from one or more of the guide stars 512. In one embodiment, the CCD optical sensor may be replaced by one CMOS detector that provides for the same degree or less of the science function as the CCD detector, depending on the science requirement. In another embodiment, the science optical sensor 122 and/or the tracking sensors 124 may be replaced with any suitable sensor or combination of sensors. The field of view of the lens 120 is shown by a circle 514 and represents the extent of light incident on the array 120. The field of view 514 is determined by the characteristics of the lens, such as the lens 110 of FIG. 1. Light, including light from the target star 510 and the guide stars 512, falling within the field of view 514 can be detected from the science optical sensor 122 and/or the tracking sensors 124. The science optical sensor 122 includes a detector portion 126 for detecting light, and each tracking sensor 124 includes a respective detector portion 128. In one embodiment, the array 120 can include a single science optical sensor 122 configured to detect both the target star 510 and the guide stars 512, and therefore, in this embodiment, no tracking sensors 124 are necessary.

The tracking sensors 124 are used to determine the attitude of the satellite 100, and in particular, the orientation of the optical system with respect to the target star. The number and locations of the tracking sensors 124 may be optimized to maximize the number of guide stars around target stars of interest. The science optical sensor 122 is configured to perform both science and star camera functions: photometry (e.g., science) functions of the space telescope, conducting relatively long integrations (e.g., up to 10 seconds) to collect as many photons as possible from the target star; and star camera function, conducting relatively short integrations (e.g. 0.1 sec) to detect the images of the stars surrounding the target star, which are combined with those of guide stars from the tracking sensors 124 for attitude determination. In one example, the tracking sensors 124 may be used to track at least three guide stars surrounding the target star at an update rate that is faster than the update rate of the science optical sensor 122. As shown in the example of FIG. 5, nine guide stars 512 (not all guide stars are labeled in the figure) are detectable by the tracking sensors 124 combined because light from the guide stars falls within both the field of view 514 and the respective detector portions 128 of the tracking sensors 124.

According to one embodiment, the satellite 100 is configured to operate in several different modes during a mission. For example, after the satellite 100 is launched, it may be inserted into a 600 km, low-inclination orbit, where the attitude of the satellite may be stabilized. Subsequently, the satellite 100 may, for example, enter a cyclical pattern in which solar panels (e.g., for generating electricity) are oriented toward the sun during the daytime portion of the satellite's orbit, and in which the science payload is oriented toward a target star during the nighttime portion of the orbit to collect scientific data. Thus, the satellite 100 may change attitude repeatedly as it orbits earth. Each mode of the satellite 100 is designed to manage these different aspects of the mission, as described below.

Figure 6:
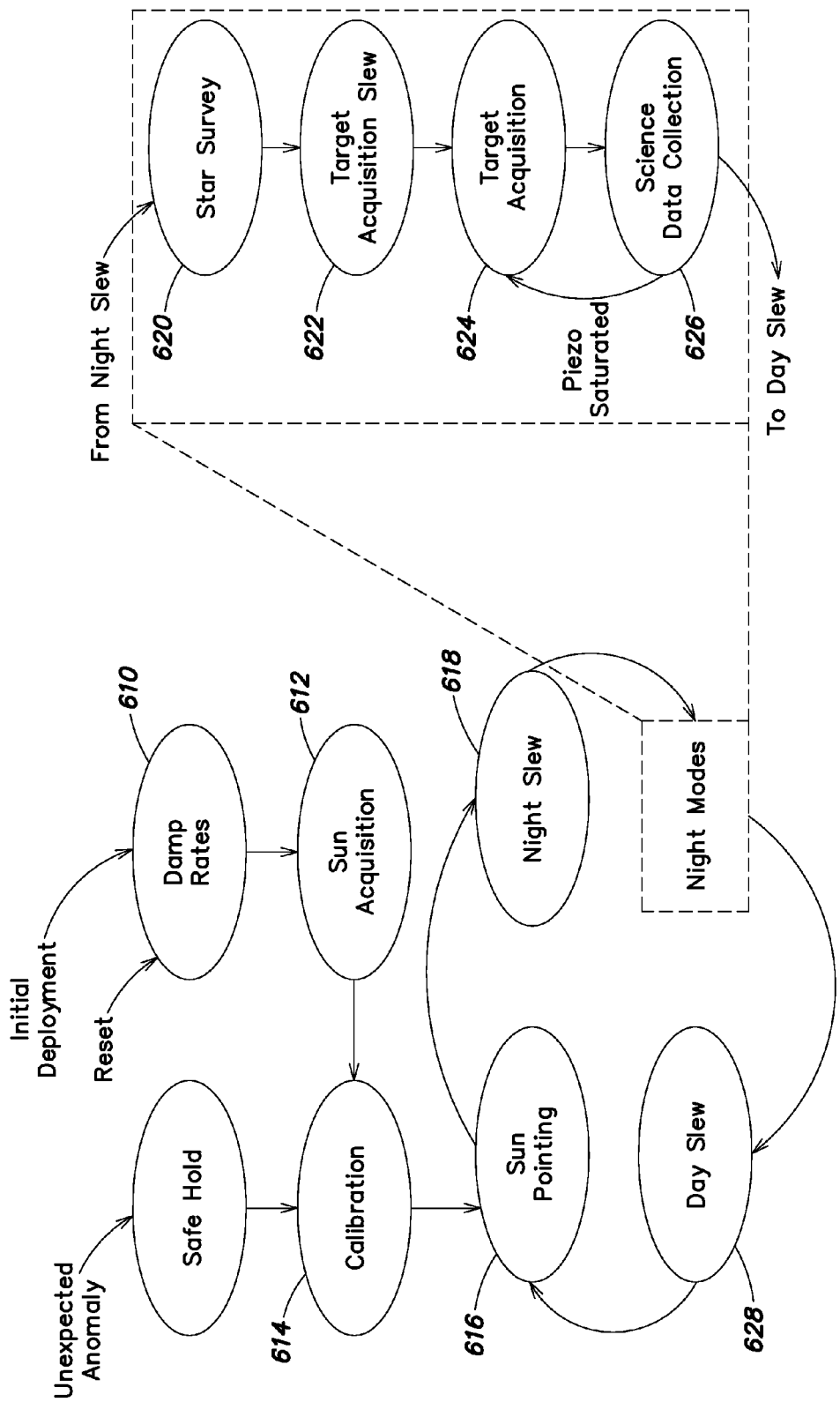
FIG. 6 is a flow diagram of one example of an attitude determination and control system in accordance with aspects of the invention.

FIG. 6 is a flow diagram of an attitude determination and control subsystem (ADCS) for the satellite 100 that operates in several different modes, according to one embodiment. The flow diagram of FIG. 6 is intended to generally describe several exemplary modes of the satellite 100, the relationship between the modes, and the events that cause the ADCS to change modes. It should be understood that the modes described herein may be implemented in any number of different ways, that one or more of the modes may be optional, and that other modes not explicitly described may be utilized to perform similar or additional functions.

Generally, the modes shown in FIG. 6 are used by a controller or processor for, among other things, determination and control of the attitude of the satellite 100 and/or a payload of the satellite during various aspects of a mission, such as described above. In particular, the modes are used to orient the satellite 100 and/or the payload in response to intentional and unintentional movements of the satellite, such as changes in attitude between daytime orbit and nighttime orbit, as well as any changes in attitude caused by disturbances induced internally (e.g., by the reaction wheels) and/or externally (e.g., by changes in the temperature of the satellite, by the forces of gravity and the atmosphere on the satellite, or other external effects). As further described below, the ADCS utilizes a two-stage control scheme to maintain the attitude of the satellite 100 (e.g., using the reaction wheels) to the extent that it can achieve high precision image stabilization of the image sensors 120 (e.g., using the piezoelectric stage actuator 130). The actuator has a limited range of movement and therefore primarily provides fine correction of the image sensor array for high precision pointing. The two-stage control scheme facilitates the coordination of the coarse attitude control of the satellite 100 and the fine precision image stabilization of the image sensors 120.

According to one embodiment, after launch, the satellite 100 is inserted in a low altitude (e.g., approximately 600-km), low-inclination orbit. As shown in FIG. 6, the satellite 100 first enters a "Damp Rates" mode 610 in which the angular rate of the satellite is slowed down with torque coils until the reaction wheels can capture and control the motion of the satellite. The satellite 100 then enters a "Sun Acquisition" mode 612 where the satellite performs an attitude maneuver to acquire the sun and point the solar panels directly at the sun to recharge the batteries. Then a "Calibration" mode 614 is entered, which initializes an Extended Kalman Filter and allows attitude estimates to converge to the true attitude. Calibration of any other instruments, such as the CCD 122, may be performed in this mode.

Once certain calibrations are complete, the satellite 100 begins nominal operations. During orbit day, the satellite 100 points the solar array toward the sun, charges its batteries, and desaturates the reaction wheels to their nominal speeds in a "Sun Pointing" mode 616. As the satellite 100 enters orbit night, the satellite enters a "Night Slew" mode 618 where the satellite performs a smooth spinup-coast-spindown eigenaxis attitude slew to the target star. Because the satellite 100 relies on the gyros and magnetometer during orbit day, the attitude estimates may have accumulated an error on the order of a few degrees. Therefore when the slew is finished, the stars observed with the CCD 122 and CMOS 124 detectors are matched against a limited star catalog to determine the current attitude of the satellite 100 in a "Star Survey" mode, also referred to as "LIS" (lost-in-space) mode 620. A "Target Acquisition Slew" mode 622 may then be performed to place the target star on the same orbit-to-orbit position on the CCD 122 and the optimal guide stars on the CMOS 124 detectors. Additional time may be allowed after the slew to damp any residual angular rates of the spacecraft in a "Target Acquisition" mode 624. Next, "Science Data Collection" mode 626 is entered where the CCD 122 collects science data, and a more stringent pointing requirement, discussed below, may be achieved. During orbit day, the satellite 100 enters "Day Slew" mode 628 to reorient the solar array toward the sun.

According to one aspect, the spacecraft should achieve a photometric precision of approximately 100 ppm to detect an Earth-sized exoplanet. One of the largest challenges with obtaining this level of precision is that the sensitivity on the main science instrument, the CCD detector 122, may vary on the order of 50% within a pixel. Changes in the line-of-sight pointing of the spacecraft (jitter) will cause the light from the target star to illuminate different parts of the CCD detector 122, which changes the measured intensity of the target star.

Therefore, to achieve the photometric precision required to detect Earth-sized exoplanets, the target star should remain on the same position of the detector portion 126 the CCD sensor 122 to within a fraction of a pixel, which is equivalent to controlling the attitude of the satellite to within several arcseconds. This stems from the fact that the CCD 122 response to light changes both within and between pixels due to noise in the CCD. Further, the CCD 122 photometric signal may be corrupted by jitter noise caused by pixel response non-uniformity and movement of the target star on the CCD detector 126 due to satellite pointing errors. Movement of the target star, by even less than one pixel, may cause enough variation of measured photons to mask the signature of Earth-sized exoplanets. Thus, restricting the target star motion to approximately 5.0 arcseconds in the cross-boresight axes ($3\sigma$) is desirable. This jitter level corresponds to the noise level of the measured brightness of the target star and therefore the detectable size of any transiting exoplanets. As discussed above, no prior satellites of this small size have demonstrated such a high level of pointing precision. By meeting this level of precision, Earth-sized exoplanets may be detected around stars down to 4th magnitude.

Figure 7:
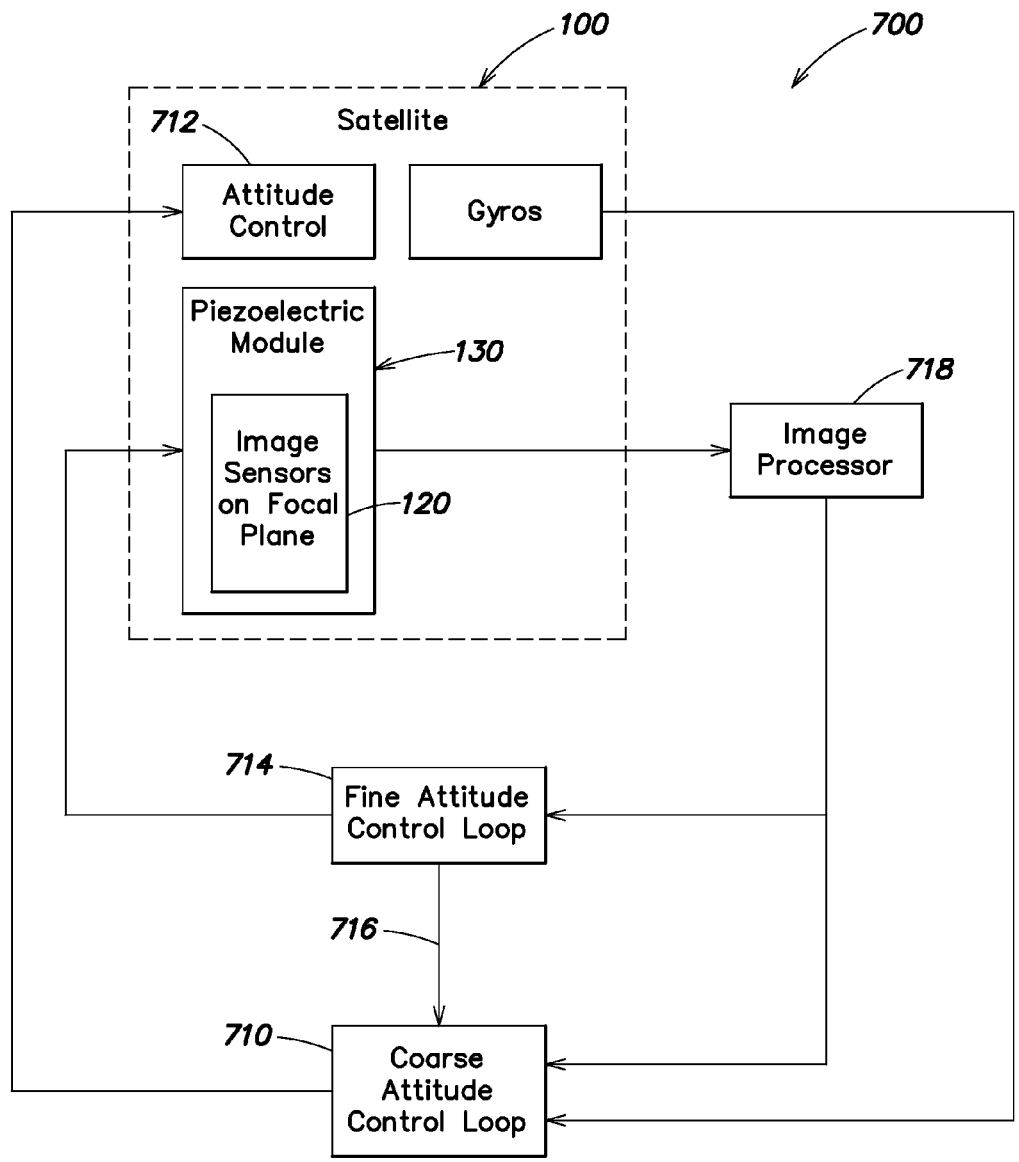
FIG. 7 is a block diagram of one example of a two-stage attitude control system in accordance with aspects of the invention.

In one embodiment, precise pointing of the satellite 100 during the "Science Data Collection" mode 626 (see FIG. 6) is achieved through a two-stage attitude control scheme, such as described above. FIG. 7 is a block diagram of an exemplary two-stage attitude control system 700 for independently controlling, using images generated by the image sensors, the attitude of the satellite 100 and a position of the image sensors 120 with respect to the optical axis 136. The first stage includes a coarse attitude control loop 710 that commands the reaction wheels and other attitude control components 712 at, for example, a rate of 4 Hz. The second stage includes a fine image stabilization control loop 714 that commands the piezoelectric stage actuator 130 at, for example, a rate of 12 Hz. Some data 716 may be exchanged between the first stage and the second stage, such as the position of the piezoelectric stage actuator which is used to bias the attitude of the satellite in a way that the position of the piezoelectric stage actuator is balanced around its neutral position as much as possible. An image processor 718 is configured to process light detected by the array of image sensors 120 for use by various control functions, such as the first and second stages described above.

Coarse attitude control 710 may be achieved using a set of reaction wheels (not shown), although desaturation is not always used during the "Science Data Collection" mode 626. In one example, the baseline reaction wheel unit may be a MAI-200, sold by Maryland Aerospace Inc. of Crofton, Md. Fine attitude control is performed by the piezoelectric translation stage actuator 130, to which the array of image sensors 120 is coupled. To achieve the desired photometric precision, the target star image (e.g., target star 510 of FIG. 5) should be as nearly stationary on the array 120 as possible. Any significant motion of the star image could result in a change in the signal due to pixel sensitivity variation, resulting in additional noise. The reaction wheels are configured to control the satellite 100 attitude within a first positioning threshold of approximately 120 arcseconds ($3\sigma$) in all three axes. Residual pointing errors down to the arcsecond level are removed using the piezoelectric stage actuator 130. In one embodiment, the piezoelectric stage actuator 130 is configured to translate in the plane of the image sensors 120 to keep the target star located on the same set of pixels to within a second positioning threshold of approximately 5.0 arcseconds ($3\sigma$) and thus stabilize the image independently of changes to the attitude of the satellite. Such stabilization enables high photometric precision to be achieved at the image sensors 120 despite the presence of small disturbances in the attitude of the satellite 100, which may be caused by vibration of the reaction wheels, sensor noise, and/or quantization error of the command. In another embodiment, the piezoelectric stage actuator 130 can be mounted to the lens and configured to translate the lens 110 instead of the image sensors 120.

Figure 8:
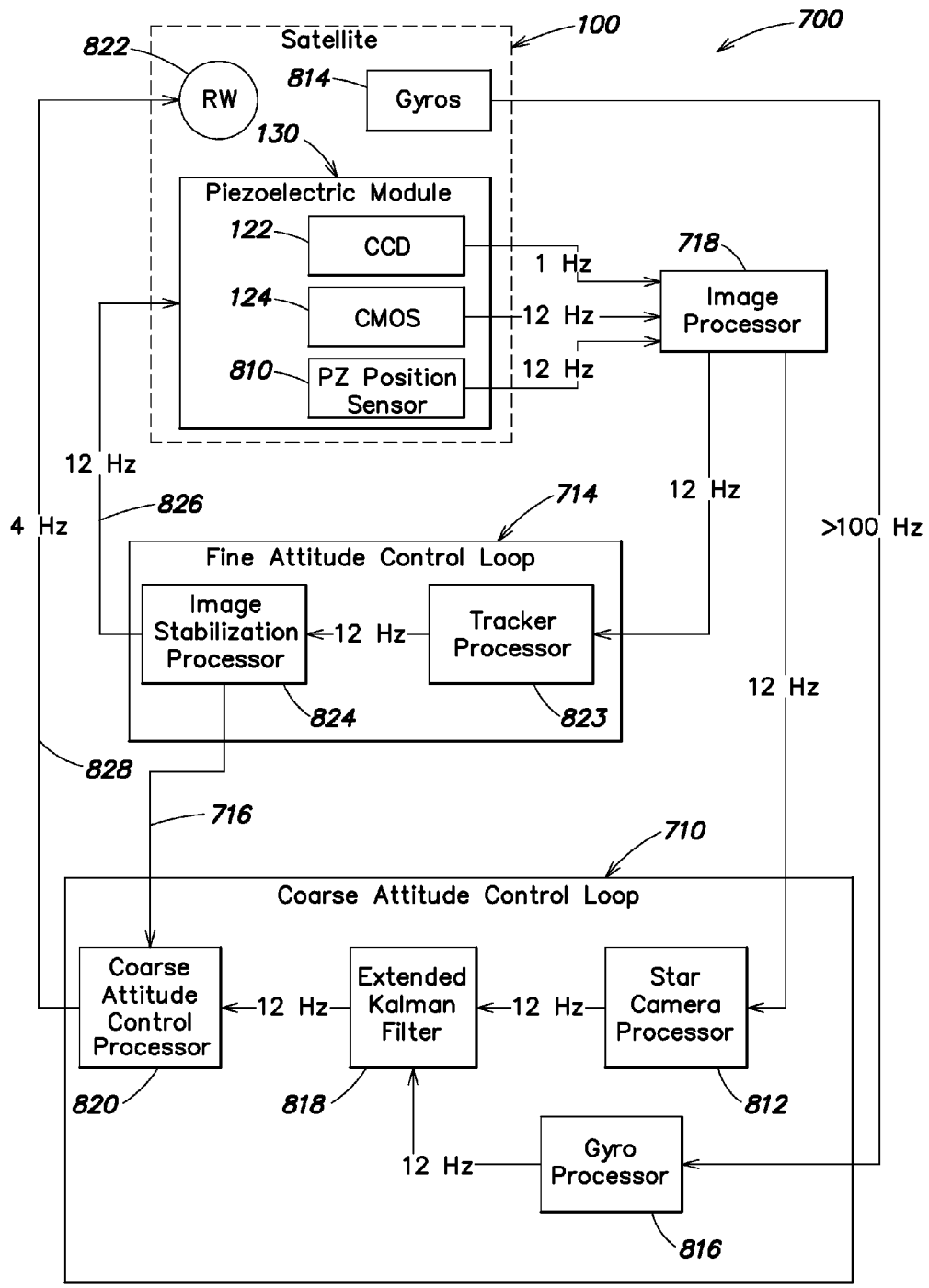
FIG. 8 is a block diagram of one example of the two-stage attitude control system of FIG. 7 showing additional details.

FIG. 8 shows a detailed block diagram of the two-stage attitude control system 700 of FIG. 7. In the fine attitude control loop 714, the 12 Hz output of the CMOS detectors 124 are first processed by the image processor 718 to be used for control commands. The 1 Hz output of the CCD detector 122 is also provided to the image processor 718, for example, at 1 Hz. The position of a piezoelectric actuator 810 is also provided to the image processor 718, for example, at 12 Hz. Image frames from the CCD detector 122 and/or each of the CMOS detectors 124 may be partitioned to small regions of interest around the brightest guide stars. In one example, these partitions may then be processed to determine each guide star's centroid using a center of mass calculation. Since these centroids contain some amount of effective delay, this delay can be compensated through further processing. Delays may be caused, for example, by the finite integration time of the detector, processing time of the sensor electronics, and/or processing time of the avionics.

Because, in one embodiment, the image sensors 120 are mounted to the piezoelectric stage actuator 130, the centroid measurements are in the moving image frame of the piezoelectric stage actuator. The centroids are converted to an optical frame that is fixed relative to the lens 110, by adding the position of the piezoelectric stage 130. With the rate information from the previous centroid locations, such as described below, or gyro measurement, the current centroid location in the image frame may be propagated forward in time to compensate for fixed, deterministic time delays.

For the coarse attitude control loop 710, the images (e.g., star centroids) in the camera frame from the CCD 122 and CMOS detectors 124 are used in a star camera processor 812. The images from the CCD detector 122 are interpolated during 1 Hz sampling period to provide 12 Hz output synchronized to the output from the CMOS detector 124. These centroids are matched to known stars in a star catalog stored on board. With this information, the attitude quaternion is estimated with the QUaternion ESTimation (QUEST) algorithm. In addition to the CCD and CMOS detectors, in another embodiment, gyros 814 can be used. The gyro outputs are filtered and downsampled by a gyro processor 816 to match the 12 Hz CMOS 124 output, and biases are subtracted out. These biases are estimated by an Extended Kalman Filter (EKF) 818, which combines the attitude quaternion measurements (from the processed CCD and CMOS detectors' output) and the processed gyro measurements. The attitude quaternion and angular rate estimate from the EKF are fed into a nonlinear proportional-derivative type reaction wheel control law in a coarse attitude control processor 820, which in turn produces a quaternion command 828 for the reaction wheel 822. Further, the position of the piezoelectric stage actuator 130 can be fed into the coarse attitude control processor 820 in data 716. The position of the piezoelectric stage actuator is related to a pointing error of the satellite 100 because, as discussed above, the position of the actuator 130 is changed to essentially compensate for pointing errors of the satellite 100. An integrator with a small gain can be optionally added to this controller to remove any long-term biases on the piezoelectric stage actuator 130 and help reduce the probability of saturation. To further ensure that the piezoelectric stage actuator 130 is not saturated, any remaining long-term biases in the stage can change the quaternion command 828 given to the reaction wheel 822.

For the fine pointing control loop 714, the image of a target star is processed by the tracker processor 823 to provide a position of the target star in the optical frame at 1 Hz or less output rate. The position is compared to the desired position and converted to an error signal. The intermediate error signal between direct measurements of the position of the target star is estimated from the changes in positions of the guide stars in the optical frame. This is an important function of the tracker processor, which is based on a pinhole-camera-model-based image motion estimation algorithm. The tracker processor 823 calculates the change in position with respect to the optical axis of at least two guide stars between one image frame and a subsequent image frame. The tracker processor 823 estimates the changes of roll angle of the image sensors 120 about the optical boresight axis, the other two angles orthogonal to the boresight axis, and to each other using a least-square fit approach. The tracker processor 823 reconstructs the change of position of the target star from these estimated Euler angles of the image sensors and the pin-hole camera model. The error signal is fed into a proportional-integral type control law in an image jitter processor 824 to give a position command 826 to the piezoelectric module 130.

Examples and Simulation Results

The function and advantages of certain aspects and embodiments will be more fully understood from the following examples and simulation results. The examples are intended to be illustrative in nature and are not to be considered as limiting the scope of the systems and methods discussed herein.

Figure 9:
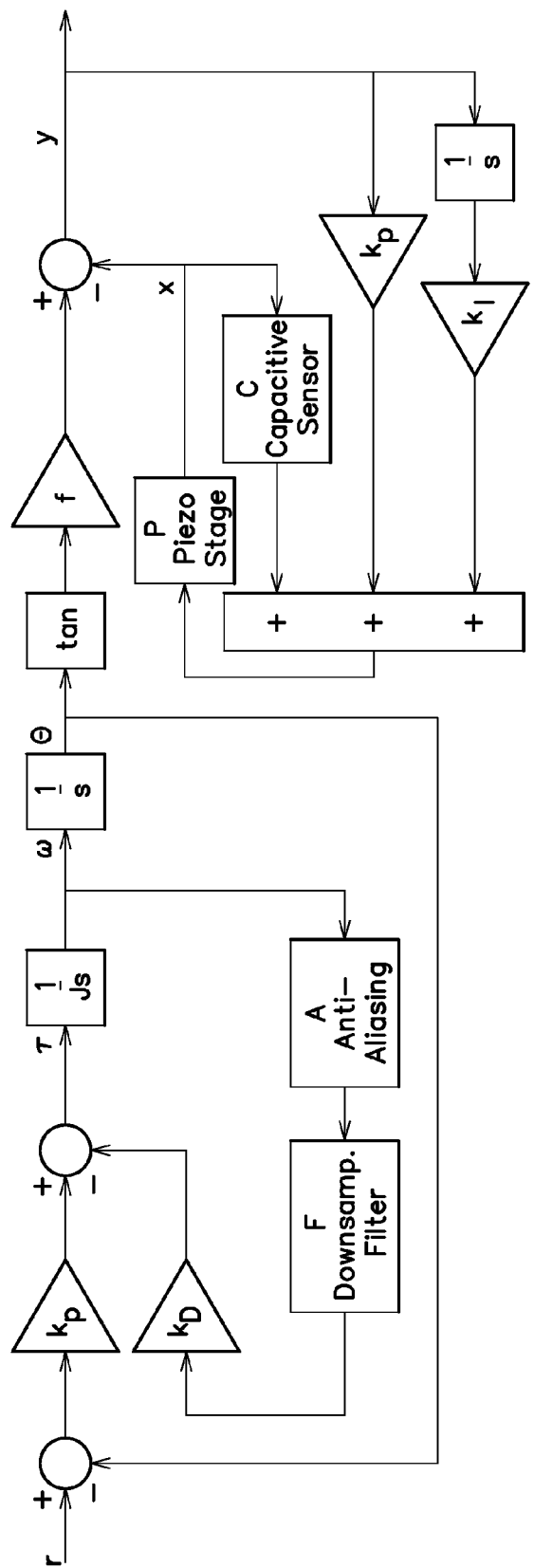
FIG. 9 is a block diagram of a single-axis analytical model of a two-stage attitude control system in accordance with aspects of the invention.

The selected gains for the two-stage control system 700 may include some stability margins. FIG. 9 shows a simplified single-axis block diagram of the two-stage control system 700 for analyzing the gain and phase margins analytically according to a model of one embodiment. In this model, the delay compensation and extended Kalman filter (EKF) are not represented, and the attitude of the satellite θ is directly measured. The control loops are only one-way coupled since they are two loops in series. The output of the coarse rigid-body attitude control loop is the input to the fine line-of-sight pointing control loop. This greatly simplifies the control law design since the gains can be selected independently for stability.

Table 1 shows the exemplary gain and phase margins for the linear analysis represented by the block diagram in FIG. 9. Phase margin is also expressed in terms of an equivalent time delay (calculated by dividing the phase margin by the crossover frequency), which gives a requirement on allowable processing delay to maintain stability.

TABLE 1

Coarse and Fine Loop Gain and Phase Margins.

| | Gain Margin | Phase Margin | |
|---|---|---|---|
| Coarse Loop | 30 dB @ 0.23 Hz | 75° @ 0.020 Hz | 10.9 s |
| Fine Loop | 6.3 dB @ 6.0 Hz | 61° @ 1.9 Hz | 0.089 s |
| Typical Requirement | ≥6 dB | ≥30° | |

Figure 10A:
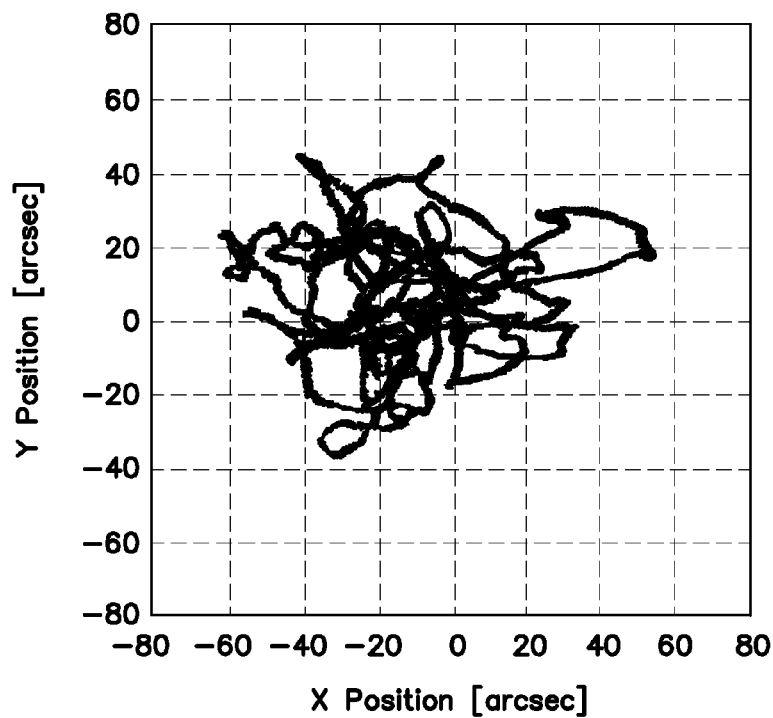
FIGS. 10A and 10B show the results of an exemplary simulation in accordance with aspects of the invention.
Figure 10B:
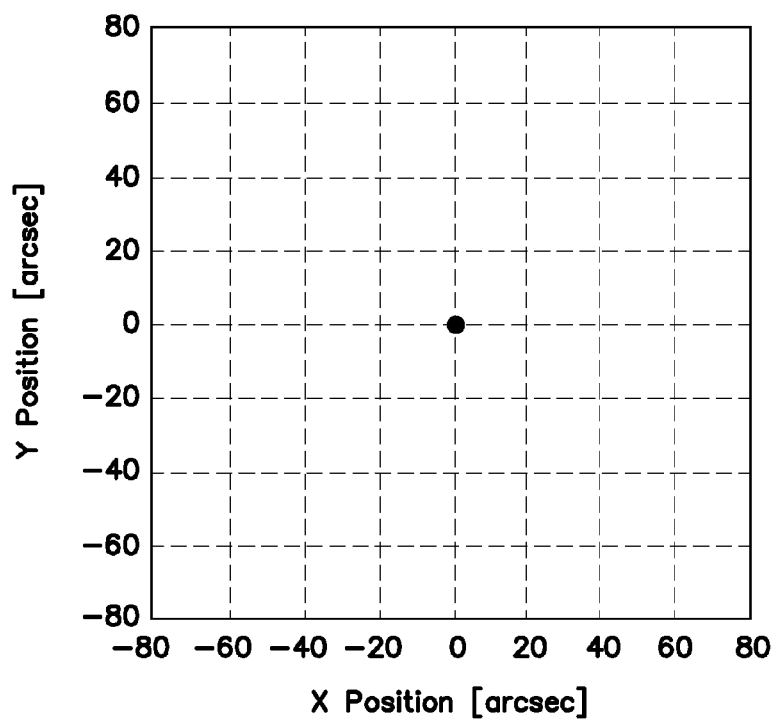

FIGS. 10A and 10B show the results of a simulation in accordance with one aspect. The plot of FIG. 10A shows the motion of the target star 510 on the science detector 122 of FIG. 5 over a period of five minutes when the piezoelectric stage 130 is disabled (i.e., static). It can be seen that there is a large-amplitude, low-frequency component that causes the target star to wander around the science detector 122. This is due to the low-bandwidth, closed-loop response of the rigid-body attitude dynamics in the presence of disturbances and sensor noise. Superimposed on this is a high-frequency, low-amplitude jitter due to disturbances caused by the reaction wheel of the satellite. The plot of FIG. 10B shows that when the piezoelectric stage is activated, most of the low frequency error is removed. The achieved line-of-sight pointing precision from this baseline simulation was 1.4 arcseconds (3σ).

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the invention. For example, some embodiments may be used without gyroscopes for star camera only attitude determination. In another example, some embodiments may be used for precise pointing of satellites in a range of applications, including optical communications applications as well as scientific applications. In another example, the image sensors 120 may include sensors having different pixel sizes and/or update rates. Accordingly, the foregoing description and drawings are by way of example only, and the scope of the invention should be determined from proper construction of the claims and their equivalents.

What is claimed is:

1. An optical system for use in an Earth-orbiting satellite, the optical system comprising:

a plurality of image sensors disposed on a focal plane having a reference axis orthogonal thereto, the plurality of image sensors configured to generate at least one image frame from light detected by the plurality of image sensors, the at least one image frame including a target star and at least one guide star;

optics configured to focus incident light onto the plurality of image sensors;

a piezoelectric actuator coupled to the plurality of image sensors and configured to translate the plurality of image sensors in at least two axes each orthogonal to the reference axis, the piezoelectric actuator having a position with respect to the reference axis; and at least one controller operably coupled to the plurality of image sensors and the piezoelectric actuator and configured to:

determine a position of the target star within the at least one image frame;

track changes in a position of the at least one guide star within the at least one image frame;

stabilize the position of the target star by adjusting the position of the piezoelectric actuator based on the changes in the position of the at least one guide star;

generate a pointing error of the satellite based on the changes in the position of the at least one guide star; and stabilize an attitude of the satellite based at least on the pointing error.

2. The optical system of claim 1, wherein at least one of the plurality of image sensors has a smaller pixel size than another one of the plurality of image sensors.

3. The optical system of claim 2, wherein the plurality of image sensors includes a science optical sensor and at least one tracking sensor disposed adjacent to the science optical sensor, wherein the science optical sensor is configured to operate at a science optical sensor rate, and wherein the at least one tracking sensor is configured to operate at a tracking sensor rate that is not less than the science optical sensor rate.

4. The optical system of claim 3, wherein the at least one tracking sensor is configured to generate the at least one image frame including the at least one guide star.

5. The optical system of claim 4, wherein the science optical sensor is configured to generate the at least one image frame including the at least one target star.

6. The optical system of claim 5, wherein the science optical sensor includes one of a charge coupled device (CCD) optical sensor and a complementary metal-oxide-semiconductor (CMOS) detector.

7. The optical system of claim 6, wherein the at least one tracking sensor includes a CMOS detector.

8. The optical system of claim 1, wherein the optics includes a single-lens reflex (SLR) camera lens.

9. The optical system of claim 1, wherein the optics includes folded optics.

10. The optical system of claim 1, wherein the optics includes a Cassegrain reflector.

11. The optical system of claim 1, wherein the focal plane array, the optics, the piezoelectric actuator and the controller are configured to be mounted in a satellite having dimensions of approximately 10×10×34 cm$^3$.

12. The optical system of claim 11, wherein the mass of the satellite is approximately 5 kilograms or less.

13. A method of operating an optical system in an Earth-orbiting satellite, the optical system including a plurality of optical sensors arranged on a focal plane and configured to generate an image, optics having a reference axis therethrough and configured and arranged to focus incident light onto the plurality of optical sensors, and a piezoelectric stage actuator coupled to the plurality of optical sensors and configured to translate the plurality of optical sensors in at least two axes each orthogonal to the reference axis, the method comprising:
  detecting at least three guide stars and a target star within the image;
  estimating an attitude of the satellite from positions of the at least three guide stars on the basis of a guide star database;
  stabilizing, within a coarse threshold, the attitude of the satellite with respect to a desired attitude by commanding changes to the attitude of the satellite based on a difference between the estimated attitude and the desired attitude;
  estimating an angular rate of the focal plane from rates of the positions of the at least three guide stars;
  estimating a position error of the target star based on the angular rate of the focal plane; and
  stabilizing, within a fine threshold that is smaller than the coarse threshold, a position of the target star with respect to one of the plurality of optical sensors by adjusting a position of the plurality of optical sensors with respect to the reference axis based on the estimated position error of the target star.

14. The method of claim 13, wherein estimating the attitude of the satellite includes estimating an attitude quaternion of the satellite using a quaternion-based attitude estimation algorithm.

15. The method of claim 14, further comprising refining the estimated attitude using an extended Kalman filter.

16. The method of claim 13, further comprising calculating positions of the at least three guide stars based on the image and at least one of a position of the piezoelectric stage actuator and a position of the optics.

17. The method of claim 16, further comprising continuously estimating an angular velocity of the focal plane based on a rate of change of the estimated positions of the at least three guide stars.

18. The method of claim 16, further comprising continuously estimating a rate of change of the position of the target star based on the angular velocity of the focal plane.

19. The method of claim 18, further comprising intermittently calculating the position of the target star based on the image and at least one of a position of the piezoelectric stage actuator and a position of the optics.

20. The method of claim 19, wherein estimating the position of the target star includes continuously estimating the position of the target star based on the intermittently calculated position of the target star and a rate of change of the position of the target star.

21. The method of claim 20, further comprising combining two intermittently calculated positions of the target star and the rate of change of the position of the target star using a Kalman filter.

22. The method of claim 21, further comprising calculating the position error between the estimated position of the target star and a desired position of the target star.

23. The method of claim 13, wherein the coarse threshold is approximately 120 arcseconds (3σ) or less, and wherein the fine threshold is approximately 5 arcseconds (3σ) or less.

24. An optical system for use in an Earth-orbiting satellite, comprising:
  a plurality of optical sensors;
  optics having a reference axis therethrough and configured to focus incident light onto the plurality of optical sensors;
  an actuator coupled to the plurality of optical sensors and configured to translate the plurality of optical sensors in at least two axes each orthogonal to the reference axis; and
  means coupled to the plurality of optical sensors and the actuator for independently stabilizing, using images generated by the plurality of optical sensors, an attitude of the satellite and a position of the plurality of optical sensors with respect to a target star.

* * * * *

UNITED STATES PATENT AND TRADEMARK OFFICE
CERTIFICATE OF CORRECTION

PATENT NO. : 8,772,690 B2  Page 1 of 1
APPLICATION NO. : 13/364261
DATED : July 8, 2014
INVENTOR(S) : Matthew W. Smith et al.

It is certified that error appears in the above-identified patent and that said Letters Patent is hereby corrected as shown below:

In the Specification:

Below the Title, and before the heading "BACKGROUND" insert
        -- FEDERALLY SPONSORED RESEARCH
    This invention was made with government support under NNX08AX18G awarded by NASA. The US government has certain rights in the invention.--

At Column 6, line number 10, delete "images" and insert --image--.

Signed and Sealed this
Ninth Day of December, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,772,690 B2  
APPLICATION NO. : 13/364261  
DATED : July 8, 2014  
INVENTOR(S) : Matthew W. Smith et al.

Page 1 of 1

It is certified that error appears in the above-identified patent and that said Letters Patent is hereby corrected as shown below:

In the Specification:

Column 1, line 5,
Below the Title, and before the heading "BACKGROUND" insert
-- FEDERALLY SPONSORED RESEARCH
This invention was made with government support under NNX08AX18G awarded by NASA. The US government has certain rights in the invention.--

At Column 6, line 10, delete "images" and insert --image--.

This certificate supersedes the Certificate of Correction issued December 9, 2014.

Signed and Sealed this
Twentieth Day of January, 2015

Michelle K. Lee
*Deputy Director of the United States Patent and Trademark Office*